July 25, 1944.                A. A. NEUBAUM ET AL                2,354,473
                              RERAILER FOR CARS ON TRACKS
                                Filed Feb. 13, 1943          2 Sheets-Sheet 1
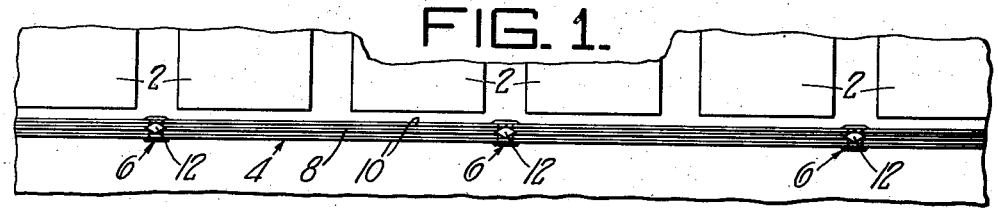
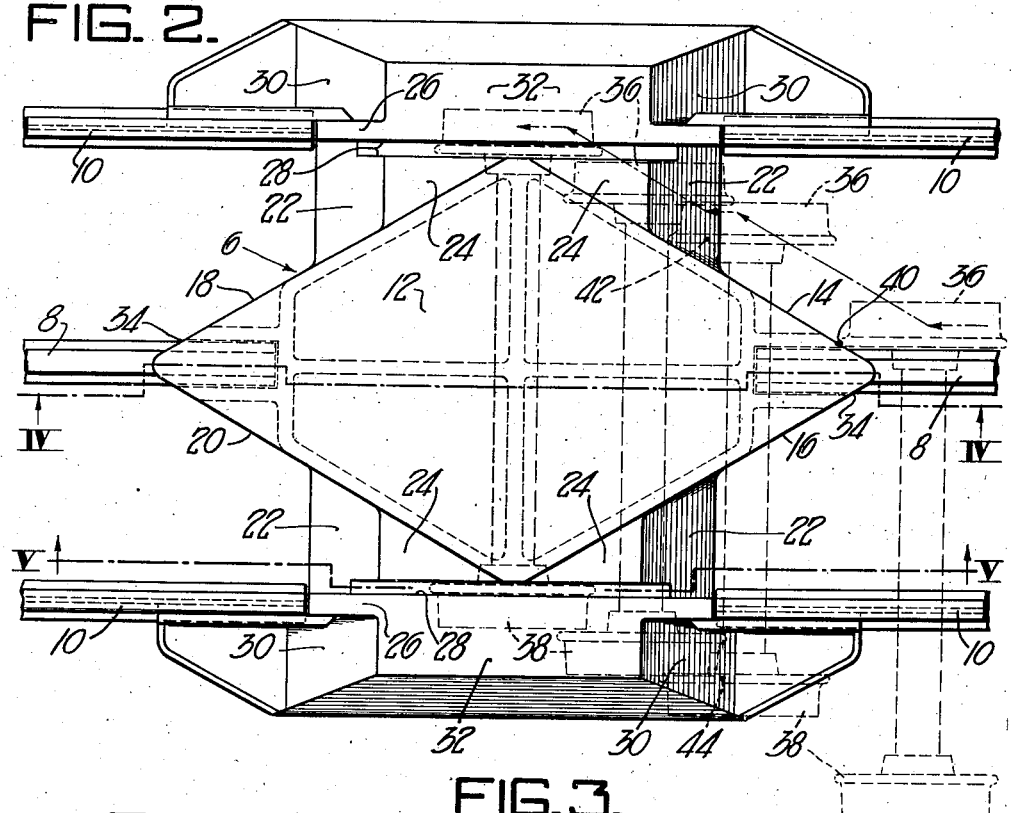
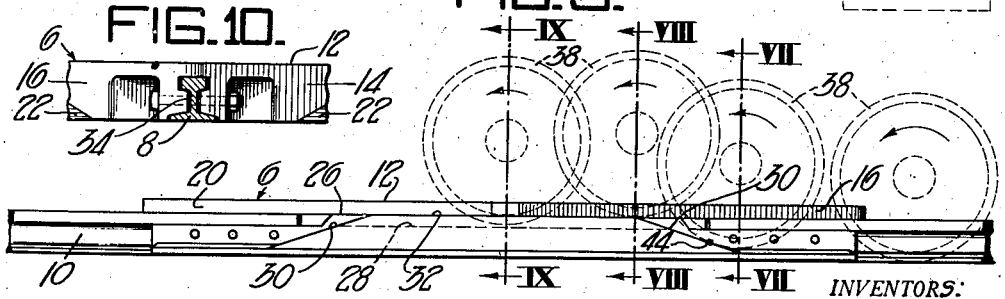
INVENTORS:
ARCHIE A. NEUBAUM and THOR ENGSTROM,
BY: John E. Jackson
THEIR ATTORNEY.

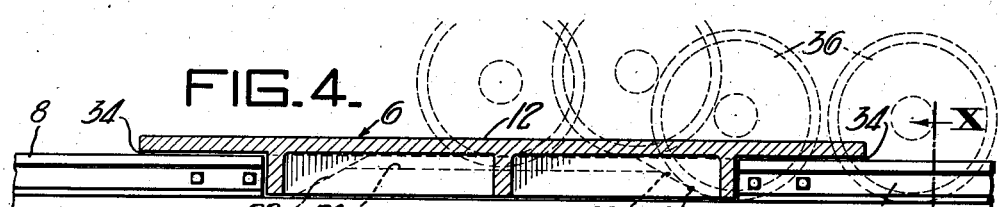
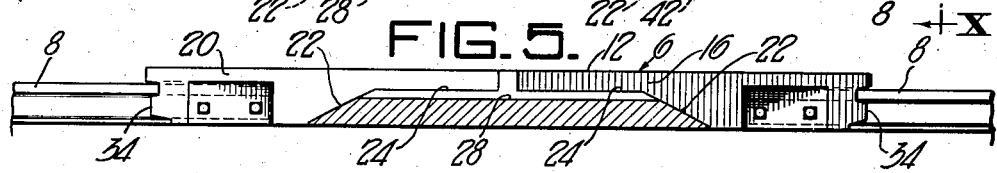
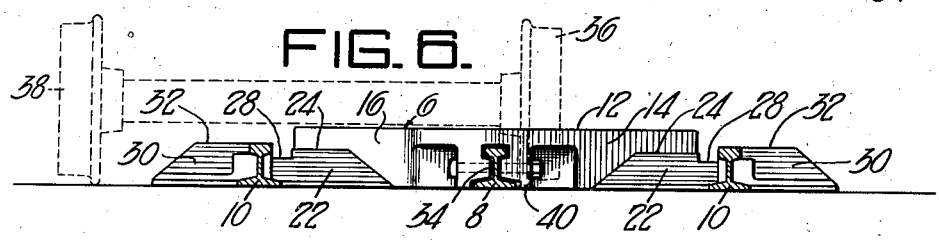
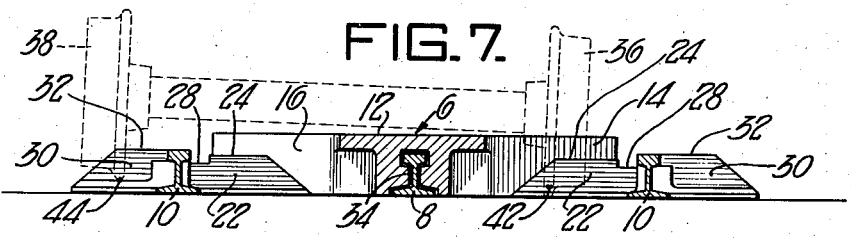
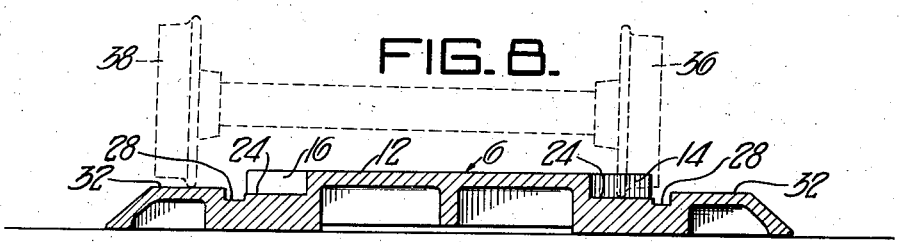
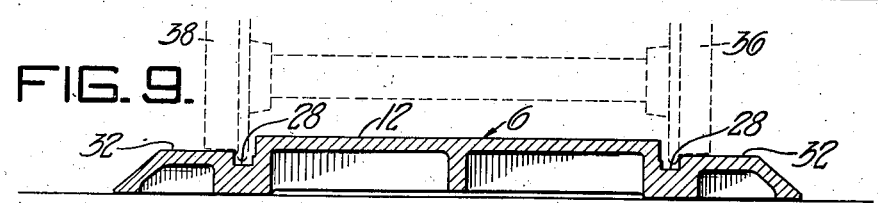
INVENTORS:
ARCHIE A. NEUBAUM and THOR ENGSTROM,
BY:
THEIR ATTORNEY.

Patented July 25, 1944

2,354,473

UNITED STATES PATENT OFFICE 2,354,473

RERAILER FOR CARS ON TRACKS

Archie A. Neubaum and Thor Engstrom,
Gary, Ind.

Application February 13, 1943, Serial No. 475,814

5 Claims. (Cl. 104—267)

This invention relates to a rerailer and more particularly to such a rerailer as is used for replacing derailed car wheels on track rails.

This invention is particularly adapted for use on the charging car tracks of open-hearth furnaces. Charging boxes filled with scrap are placed on the top of small cars which are pushed along the tracks usually by the peel of a charging machine. These cars often become derailed due to scrap spilling out of the car onto the rail and to the buckling action of the train of cars and the fact that the track is usually flush with the charging floor. The time allowed for charging an open-hearth furnace is so important that the charging operation cannot be delayed to replace derailed cars. The result is that the original derailed car usually drags more cars off the rails and track ties, floor switches and cars are damaged. Often there is delay in the charging operation.

An object of this invention is to provide means for quickly replacing derailed car wheels on the rails and thereby prevent dragging more cars off the rails.

Another object is to provide a rerailing device that forms a permanent part of the track.

These and other objects will be more apparent after referring to the following specification and attached drawings in which:

Fig. 1 is a plan view showing the arrangement of the rerailers on a charging car track;

Fig. 2 is an enlarged plan view of the rerailer in place on the track;

Fig. 3 is a side view of the rerailer;

Fig. 4 is a sectional view on the line IV—IV of Fig. 2;

Fig. 5 is a sectional view on the line V—V of Fig. 2;

Fig. 6 is an end view of the rerailer showing the car wheels in their first position;

Figs. 7, 8, and 9 are sectional views on the lines VII—VII, VIII—VIII and IX—IX, respectively, of Fig. 3 showing the car wheels in various positions; and Fig. 10 is a sectional view on the line X—X of Fig. 4.

Referring more particularly to the drawings, the reference numeral 2 indicates open-hearth furnaces having a track 4 along the front thereof. Rerailers 6 are built into the track and spaced in such a manner that the number of derailed cars will be insufficient to stall the train. The guide rail 8 extends from one rerailer to the next on the center line of the track. The track rails 10 are cut away as shown, to form openings therein for receiving the rerailer. The rerailer has a substantially parallelogrammatic guide 12 having a plurality of guiding edges 14, 16, 18 and 20 thereon. Each of the guiding edges extend from a point between the tracks to a point on one of the track rails 10 as shown. Between each of the guiding edges and the adjacent track rail is a ramp 22 which slopes upwardly toward the point of convergence of the guiding edge and the rail. The top of the ramp is lower than the top of the guiding edge and is of such a height that the tread of the wheel will be at least as high as the top of the track rail when the flange of the wheel is resting on top of the ramp. A flat portion 24 is connected to the guide and extends from the top of the ramp to the point of convergence of the guiding edge and a rail portion 26 which substantially fills the opening in rail 10. There is a slot 28 in the flat portion 24 adjacent the rail 26 for receiving the flange of the wheel. On the outside of the rails 10 there are ramps 30 which cooperate with the ramps 22 to raise the car wheels. Each of the ramps 30 slopes upwardly in the same direction as the cooperating ramp 22 to a flat portion 32 which is the same height as the rail portion 26. The rerailer is fastened to the ties and the rails 10 so as to become a permanent part of the track. On each end of guide 12 is a cavity 34 for receiving the guide rail 8, which is bolted to the guide as shown in Figs. 4 and 10. Preferably the rerailer is made in one piece, but it will be understood that it may be made of a plurality of parts fastened together.

The operation of the device is as follows: When the car is traveling from right to left as seen in Fig. 2 and the wheel leaves the track, the car will be pulled along until the flange of the wheel contacts the guiding edge 14 at point 40. This first position is best shown in Figs. 2 and 6. As the car continues in the direction of travel, the guiding edge 14 guides the wheel 36 toward the rail 10 until the flange of the wheel contacts the ramp 22 at point 42. At approximately the same time the flange of wheel 38 will contact the ramp 30 at point 44. In this second position the wheels are positioned as shown in Fig. 7. As the movement of the car continues, the flange of wheel 36 bears against the guiding edge 14 and rolls up ramp 22 until it reaches the top of the ramp. At the same time, wheel 38 is rolling up ramp 30. The position of the wheels in this third postion is shown in Fig. 8. The wheel 36 remains in contact with the guide 14 and rolls along the flat portion 24 until the flange of the wheel 36 slides into the slot 28. At the same time wheel 38 is riding along the flat portion 32 and rail 26 until its flange drops into slot 28 (see Fig. 9).

If the wheels leave the rails 10 in the opposite direction, the guiding edge 16 will guide the wheel 38 in the same manner as guide 14 guided the wheel 36.

When the car leaves the track in traveling from left to right as seen in Fig. 2, the guiding edges 18 and 20 function in the same manner as guiding edges 14 and 16 to bring the wheels back on the tracks 10. The rerailer will guide derailed wheels back onto the track when they are less than half a gauge away from the rail. To prevent movement greater than half a gauge, the guide rail 8 is placed on the center line of the track. Regardless of the direction of travel or the direction in which the wheels leave the tracks, they will be brought back on the tracks as soon as they reach the rerailer.

While one embodiment of the invention has been shown and described, it will be apparent that other adaptations and modifications may be made without departing from the scope of the following claims.

We claim:

1. A rerailer for replacing derailed car wheels on track rails comprising a guide extending from a point between the track rails to a point adjacent one of said rails, a second guide extending from said first-named point to a point adjacent the other of said rails, a ramp between each guide and the rail adjacent thereto, each of said ramps sloping upwardly away from said first-named point, the tops of said guides being above the tops of said ramps, the tops of said ramps being of such height that the tread of said wheels will be at least as high as the top of the track rails when the flanges of the wheels are resting on the tops of said ramps, ramps adjacent to and outside the rails, said second-named ramps sloping in the same direction as the first-named ramps, and the tops of said second-named ramps being approximately in the plane of the top of said rails, and a guide rail between the track rails extending longitudinally thereof substantially to said first-named point for confining movement of said car wheels between one of said track rails and said first named point at all times on derailment.

2. A rerailer for replacing derailed car wheels on track rails comprising a guide between said rails having four guiding edges thereon, two of said edges converging from opposite directions toward one of said rails, the other of said edges converging toward the other of said rails, a ramp between each of said edges and the adjacent rail, each of said ramps sloping upwardly toward the point of convergence of said edges, the tops of said guides being above the tops of said ramps, the tops of said ramps being of such height that the tread of said wheels will be at least as high as the top of the track rails when the flanges of the wheels are resting on the tops of said ramps, ramps adjacent to and outside the rails, each of said last-named ramps cooperating with one of said first-named ramps to receive a pair of car wheels, each of said last-named ramps sloping in the same direction as the ramp cooperating therewith, the tops of said second-named ramps being approximately in the plane of the top of said rails, and a guide rail between the track rails extending longitudinally thereof substantially to the guide for confining movement of said car wheels between one of said track rails and the adjacent guiding edge at all times on derailment.

3. A rerailer for replacing derailed car wheels on track rails comprising a guide extending from a point between the track rails to a point adjacent one of said rails, a second guide extending from said first-named point to a point adjacent the other of said rails, a ramp between each guide and the rail adjacent thereto, each of said ramps sloping upwardly away from said first-named point, flat portions connected to said guide and forming continuations of the tops of said ramps, the tops of said guides being above the tops of said ramps, the tops of said ramps being of such height that the tread of said wheels will be at least as high as the top of the track rails when the flanges of the wheels are resting on the tops of said ramps, each of said track rails having an opening therein for receiving the rerailer, a rail portion in each of said openings, said flat portions having slots therein adjacent said rail portions for receiving the flanges of said wheels, ramps on the outside of said rails, said second-named ramps sloping in the same direction as the first-named ramps, and the tops of said second-named ramps being approximately in the plane of the top of said rails, and a guide rail between the track rails extending longitudinally thereof substantially to said first-named point for confining movement of said car wheels between one of said track rails and said first named point at all times on derailment 4. A rerailer for replacing derailed car wheels on track rails comprising a guide between said rails having four guiding edges thereon, two of said edges converging from opposite directions toward one of said rails, the other of said edges converging toward the other of said rails, a ramp between each of said edges and the adjacent rail, each of said ramps sloping upwardly toward the point of convergence of said edges, flat portions connected to said guide and forming continuations of the tops of said ramps, the tops of said guides being above the tops of said ramps, the tops of said ramps being of such height that the tread of said wheels will be at least as high as the top of the track rails when the flanges of the wheels are resting on the tops of said ramps, each of said track rails having an opening therein for receiving the rerailer, a rail portion in each of said openings, said flat portions having slots therein adjacent said rail portions for receiving the flanges of said wheels, ramps on the outside of the rails, each of said last-named ramps cooperating with one of said first-named ramps to receive a pair of car wheels, each of said last-named ramps sloping in the same direction as the ramp cooperating therewith, and the tops of said second-named ramps being approximately in the plane of the top of said rails, and a guide rail between the track rails extending longitudinally thereof substantially to the guide for confining movement of said car wheels between one of said track rails and the adjacent guiding edge at all times on derailment.

5. A rerailer for replacing derailed car wheels on track rails comprising a guide between said rails having four guiding edges thereon, two of said edges converging from opposite directions toward one of said rails, the other of said edges converging toward the other of said rails, a ramp between each of said edges and the adjacent rail, each of said ramps leading upwardly toward the point of convergence of said edges, the tops of said guides being above the tops of said ramps, the tops of said ramps being of such height that the tread of said wheels will be at least as high as the top of the track rails when the flanges of the wheels are resting on the tops of said ramps, each of said track rails having an opening therein for receiving the rerailer, a rail portion in each of said openings, ramps adjacent to and outside the rails, each of said last-named ramps cooperating with one of said first-named ramps to receive a pair of said car wheels, each of said last-named ramps sloping in the same direction as the ramp cooperating therewith, and the tops of said second-named ramps being approximately in the plane of the top of said rails, and a guide rail between the track rails extending longitudinally thereof substantially to the guide for confining movement of said car wheels between one of said track rails and the adjacent guiding edge at all times on derailment.

ARCHIE A. NEUBAUM.
THOR ENGSTROM.